United States Patent
Sakai et al.

(10) Patent No.: US 11,190,062 B2
(45) Date of Patent: Nov. 30, 2021

(54) AXIAL GAP TYPE ROTATING ELECTRIC MACHINE AND STATOR

(71) Applicant: Hitachi Industrial Equipment Systems Co., Ltd., Tokyo (JP)

(72) Inventors: Toru Sakai, Tokyo (JP); Tomonori Kawagoe, Tokyo (JP); Daisuke Kitajima, Tokyo (JP); Katsuyuki Yamazaki, Tokyo (JP); Toshifumi Suzuki, Tokyo (JP); Shuuichi Takahashi, Tokyo (JP); Hirooki Tokoi, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 206 days.

(21) Appl. No.: 15/555,259

(22) PCT Filed: Mar. 4, 2015

(86) PCT No.: PCT/JP2015/056277
§ 371 (c)(1),
(2) Date: Sep. 1, 2017

(87) PCT Pub. No.: WO2016/139764
PCT Pub. Date: Sep. 9, 2016

(65) Prior Publication Data
US 2018/0351419 A1 Dec. 6, 2018

(51) Int. Cl.
*H02K 1/18* (2006.01)
*H02K 21/24* (2006.01)
(Continued)

(52) U.S. Cl.
CPC .............. *H02K 1/182* (2013.01); *H02K 1/17* (2013.01); *H02K 3/18* (2013.01); *H02K 3/28* (2013.01);
(Continued)

(58) Field of Classification Search
CPC ............ H02K 1/182; H02K 1/17; H02K 3/47; H02K 3/32; H02K 3/30; H02K 3/18;
(Continued)

(56) References Cited

U.S. PATENT DOCUMENTS

| 5,597,523 A * | 1/1997 | Sakai | ................... H02K 15/12 264/219 |
| 6,713,927 B2 * | 3/2004 | Kikuchi | ................... H02K 3/24 310/214 |

(Continued)

FOREIGN PATENT DOCUMENTS

| EP | 2 763 288 A2 | 8/2014 |
| JP | 2000-14066 A | 1/2000 |

(Continued)

OTHER PUBLICATIONS

Translated version of foreign patent JP2002027694 with Espacenet. (Year: 2002).*

(Continued)

*Primary Examiner* — Shawki S Ismail
*Assistant Examiner* — Htet Z Kyaw
(74) *Attorney, Agent, or Firm* — Crowell & Moring LLP

(57) ABSTRACT

The moldability of the stator of an axial gap type rotating electric machine improved. The axial gap type rotating electric machine has: a stator comprising core members disposed about a rotating shaft in a ring shape with a predetermined space from adjacent core members, said core members each having a core around which a coil is wound, the number of the turns of the coil being less on the outer perimeter side than on the inner perimeter side, the core members being molded with mold material; and a rotor facing an end surface of the core in the shaft direction through a predetermined gap. The core members comprise: a first core member in which the number of coil winding (Continued)

layers on one side in the shaft direction is larger than the number of winding layers on the other side; and a second core member in which the number of coil winding layers on one side in the shaft direction is less than the number of winding layers on the other side. In the stator, the first and second core members are alternately disposed, with the coil on the side where the number of the winding layers of the first core member is larger and the coil on the side where the number of the winding layers of the second core member is smaller opposed to each other.

10 Claims, 13 Drawing Sheets

(51) Int. Cl.
H02K 3/18 (2006.01)
H02K 3/28 (2006.01)
H02K 1/17 (2006.01)
H02K 3/30 (2006.01)
H02K 3/32 (2006.01)
H02K 3/47 (2006.01)
H02K 15/12 (2006.01)

(52) U.S. Cl.
CPC ............... *H02K 3/30* (2013.01); *H02K 3/32* (2013.01); *H02K 3/47* (2013.01); *H02K 21/24* (2013.01); *H02K 15/12* (2013.01); *H02K 2203/06* (2013.01)

(58) Field of Classification Search
CPC ...... H02K 3/28; H02K 21/24; H02K 2203/06; H02K 15/12
USPC ............ 310/156.32, 112, 114, 214, 216.008, 310/216.009, 216.011, 216.012
See application file for complete search history.

(56) References Cited

U.S. PATENT DOCUMENTS

| | | | |
|---|---|---|---|
| 6,741,009 B1 | 5/2004 | Ando et al. | |
| 9,130,429 B2 * | 9/2015 | Shibuya | H02K 3/18 |
| 10,574,111 B2 * | 2/2020 | Kitamura | H02K 3/12 |
| 2002/0047460 A1 * | 4/2002 | Yoneda | H02K 21/16 |
| | | | 310/216.112 |
| 2005/0206264 A1 * | 9/2005 | Yamamoto | H01R 39/32 |
| | | | 310/216.001 |
| 2009/0085422 A1 * | 4/2009 | Kusawake | H02K 1/148 |
| | | | 310/216.067 |
| 2009/0167475 A1 | 7/2009 | Asano | |
| 2013/0300247 A1 | 11/2013 | Tsuchiya et al. | |
| 2014/0009009 A1 * | 1/2014 | Deguchi | H02K 1/182 |
| | | | 310/43 |
| 2016/0065020 A1 | 3/2016 | Tokoi et al. | |
| 2016/0118852 A1 * | 4/2016 | Uno | H02K 3/18 |
| | | | 310/208 |

FOREIGN PATENT DOCUMENTS

| | | | | |
|---|---|---|---|---|
| JP | 2002-27694 A | 1/2002 | | |
| JP | 2004-104870 A | 4/2004 | | |
| JP | 2007-180056 A | 7/2007 | | |
| JP | 2009-44829 A | 2/2009 | | |
| JP | 2009-124794 A | 6/2009 | | |
| JP | 2009-131038 A | 6/2009 | | |
| JP | 2011-188696 A | 9/2011 | | |
| JP | 2015-12675 A | 1/2015 | | |
| WO | WO-2009119236 A1 * | 10/2009 | | A61N 2/02 |
| WO | WO 2012/111076 A1 | 8/2012 | | |

OTHER PUBLICATIONS

Translated version of foreign patent JP2009131038 with Espacenet. (Year: 2009).*
Received STIC search report from EIC 2800 searcher Samir Patel for claim 1 on Jun. 7, 2019. (Year: 2019).*
Received STIC search report from EIC 2800 searcher Samir Patel for claim 7 on Jun. 10, 2019. (Year: 2019).*
Received STIC search report from EIC 2800 searcher Steve Chung, Chickasaw on Sep. 9, 2021. (Year: 2021).*
Extended European Search Report issued in counterpart European Application No. 15883932.4 dated Sep. 13, 2018 (eight (8) pages).
International Search Report (PCT/ISA/210) issued in PCT Application No. PCT/JP2015/056277 dated May 26, 2015 with English translation (5 pages).
Japanese-language Written Opinion (PCT/ISA/237) issued in PCT Application No. PCT/JP2015/056277 dated May 26, 2015 (4 pages).
Japanese-language Office Action issued in counterpart Japanese Application No. 2017-503263 dated May 8, 2018 with English translation (five (5) pages).

* cited by examiner

AXIAL GAP TYPE ROTATING ELECTRIC MACHINE AND STATOR

TECHNICAL FIELD

The present invention relates to an axial gap type rotating electric machine and a stator, and relates to an axial gap type rotating electric machine and a stator, where a plurality of stator core members around each of which a coil is wound are molded with a molding material.

BACKGROUND ART

To achieve higher efficiencies of rotating electric machines such as electric machines and electric power generators, PM (Permanent Magnet) type rotating electric machines using rare metals (rare earths) such as neodymium magnets as magnetic bodies have recently been known. The utilization of rare metals involves various problems, including their prices, attributable to their scarcity. In this regard, various rotating electric machines have also been known that are made capable of providing sufficient properties by effectively utilizing ferrite magnets, which do not use rare metals.

For example, the mainstream configuration of electric machines currently is a radial gap type electric machine having an air gap in the same direction as that of an output shaft. This configuration however requires ferrite magnets to be arranged along a rotation direction of the output shaft. It is thus necessary to increase the volume of the ferrite magnets in order to provide the same properties as those using neodymium magnets. As a result, the size of the electric machine increases.

As a means for preventing the size of an electric machine from increasing while ensuring the performance, for example, Patent Literature 1 discloses a radial gap type electric machine in which the coil space factor of coils wound around a stator is improved to consequently reduce the diameter of the stator. Specifically, the electric machine has such a configuration that the shapes of coils to be wound include standard rectangular coils and trapezoidal coils alternately combined to make the stator compact, and a required distance is ensured between the rectangular coil and the trapezoidal coil adjacent to each other. It is stated that this configuration allows the coil space factor of the combination of the rectangular coils and the trapezoidal coils to be increased, and makes it possible to prevent the size of the electric machine from increasing while ensuring the performance of the electric machine.

Some stators of axial gap type rotating electric machines have a configuration in which a plurality of core members are each obtained by disposing an insulating material (a bobbin/insulator or the like) made of resin or the like on a laminated core (core) made of an electromagnetic steel plate or the like, and winding a coil around an outer periphery of the insulating material, and the plurality of core members are arranged annularly around an output shaft of the rotating electric machine. The plurality of core members arranged annularly are integrally molded by means of resin molding to obtain the stator.

Here, the wound core is wound into several layers in a horizontal direction with respect to a rotation direction of an output shaft of the rotating electric machine, and a predetermined void is provided between adjacent ones of the coils arranged annularly. This void also functions as a flow passage of resin in a resin molding step for ensuring an insulation distance between each adjacent coils and for ensuring the strength as the stator.

CITATION LIST

Patent Literature

Patent Literature 1: JP-A-2007-180056

SUMMARY OF INVENTION

Technical Problem

However, the aforementioned void to be formed between the coils would have different shapes depending on the output of the axial gap type electric machine because the shape of the outer peripheral portion varies depending on the quantity of the coils to be wound. For this reason, there is a problem that the resin filling in the resin molding, which is carried out to form the stator, would be unsatisfactory depending on the size and shape of the voids, leading to a decrease in the reliability of the machine.

To ensure the flow passage at the time of resin filling, the core and the bobbin are extended in the rotary shaft direction to reduce the overlapping of coils to be wound, making it possible to ensure the size of the void. This however involves problems that impair the productivities, such as an increase in size and its accompanying increase in cost.

A technique that improves the reliability of an electric machine while ensuring a reduction in size and the productivity has been desired.

Solution to Problem

To solve the above-described problem, the configuration described in claims will be applied. One example given here is an axial gap type rotating electric machine including: a stator formed by arranging core members annularly around a rotary shaft with a predetermined void between each adjacent ones of the core members, and molding the plurality of core member with a molding material, the core members each having a core around which a coil is wound such that the number of turns of the coil is smaller on an outer peripheral side than on an inner peripheral side; and a rotor facing an end surface of the core in the shaft direction with a predetermined gap therebetween, in which the core members include: a first core member in which the number of winding layers of the coil on one side in the shaft direction is larger than the number of winding layers on the other side; and a second core member in which the number of winding layers of the coil on one side in the shaft direction is smaller than the number of winding layers on the other side; and in the stator, the first and second core members are arranged alternately such that a coil on a side where the number of winding layers is larger in the first core member and a coil on a side where the number of winding layers is smaller in the second core member face each other.

Advantageous Effects of Invention

According to one aspect of the present invention, it is possible to ensure a void between coils of adjacent core members, and to enable sufficient filling even the inside with resin, thus achieving a reduction in size, as well as, improvement in reliability and productivity of a rotating electric machine.

Other objects configurations, and advantageous effects of the present invention will be clarified by the following description.

DESCRIPTION OF EMBODIMENTS

Hereinafter, embodiments for carrying out the present invention will be described with reference to the drawings.

Embodiment

Figure 1A:
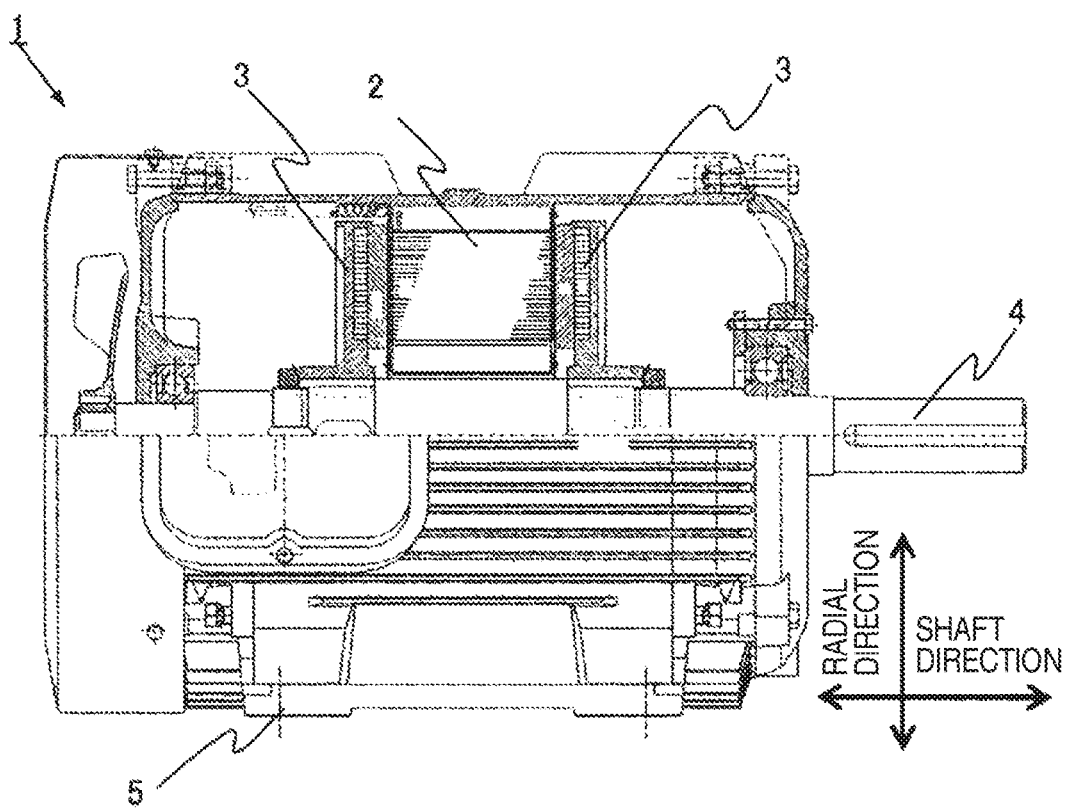
FIG. 1A is a partial cross-sectional view illustrating an overall configuration of an axial gap type electric machine according to Embodiment 1 to which the present invention is applied.
Figure 1B:
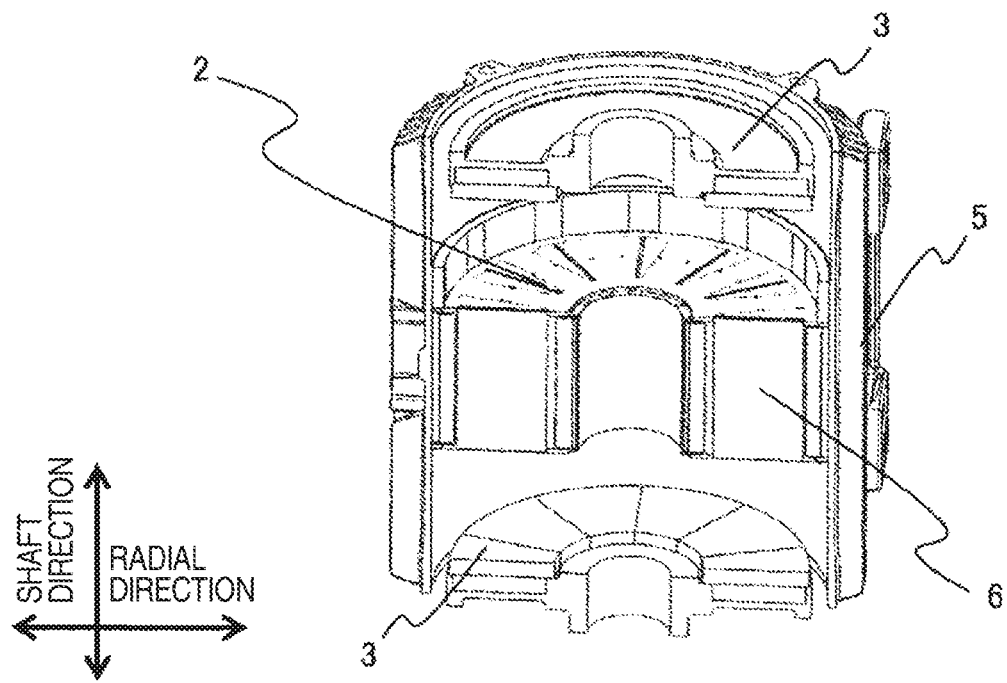
FIG. 1B is a vertical cross-sectional view illustrating a general configuration of an armature.

FIG. 1(a) illustrates in a partial cross-section an overall configuration of an axial gap type electric machine 1 according to Embodiment 1 to which the present invention is applied, and FIG. 1(b) schematically illustrates a vertical cross-sectional view of a main part of an armature. The axial gap type electric machine 1 includes, inside a generally cylindrical housing 5: a stator 2; rotors 3 which are fixed to and rotate together with an output shaft 4; end brackets on an output side and an opposite-output side which are connected to the output shaft 4 via bearings; a cooling fan which is disposed at an end portion of the rotary shaft 4, penetrating the end bracket on the opposite-output-shaft side, to rotate together with the rotary shaft 4; and a fan cover which guides a cooling air flow generated by the cooling fan toward an outer periphery of the housing 5.

As illustrated in FIGS. 1(a) and (b), the axial gap type electric machine 1 has a 2-rotor-type armature configuration in which the annular stator 2 having a magnetic flux in the direction of the output shaft has flat surfaces facing, with predetermined air gaps, the two rotors 3 having flat surfaces facing each other and provided on the output-shaft side and the opposite-output-shaft side. Note that the present invention is not limited to this configuration, and may be applied to various types such as a single-rotor type and a type of configuration including a plurality of stators and a plurality of rotors.

Figure 2A:
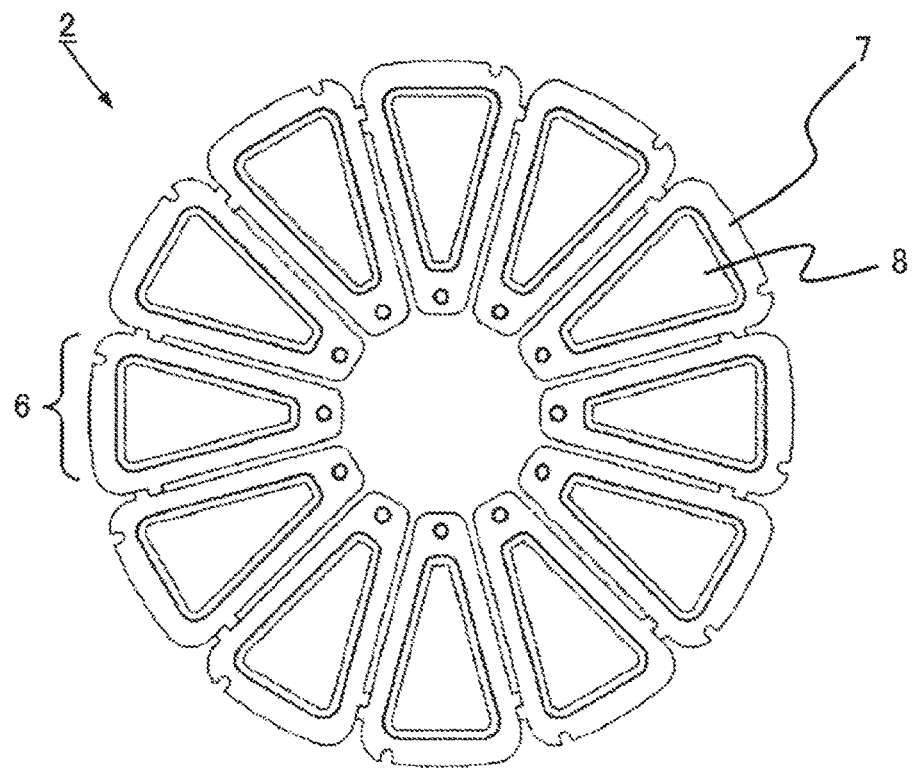
FIG. 2A is a top view of stator core members of Embodiment 1 which have been arranged annularly.

FIG. 2(a) shows a configuration of the stator 2 as observed in the shaft direction. In the stator 2, a plurality of (in this example, 12) core members 6 are arranged annularly around the rotary shaft in the housing 5. Here, flanged end portions of the respective bobbins 7 adjacent to the core members 6 in the rotation direction partially come into contact with the corresponding core members 6, so that the core members 6 are positioned. Thereafter, the annular body is molded with a molding material (resin is supposed to be used in this example).

Figure 2B:
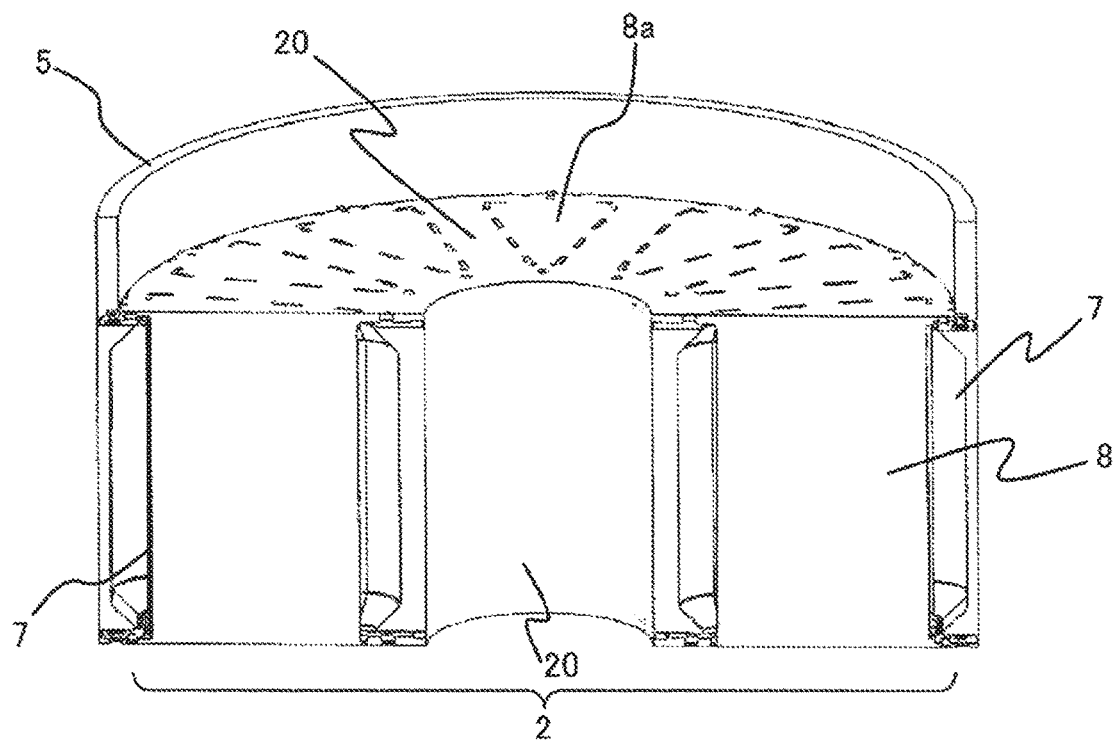
FIG. 2B is a schematic view illustrating a vertical cross-section of the stator core members which have been resin-molded.

FIG. 2(b) illustrates a vertical cross-section of the stators 2 after resin molding. The whole of each core member 6, such as a space between the core members and a space between the core member and the housing, is covered with a molding resin 20 except a core end portion 8a (a dotted-line portion) of the core 8. In addition, the stator 2 is fixed to an inner periphery of the housing 5 by the molding. Note that it is also possible to prepare the stator 2 solidified separately as a strengthened member by molding or the like, and to fix the stator 2 to the housing 5 with bolts or the like.

Figure 3A:
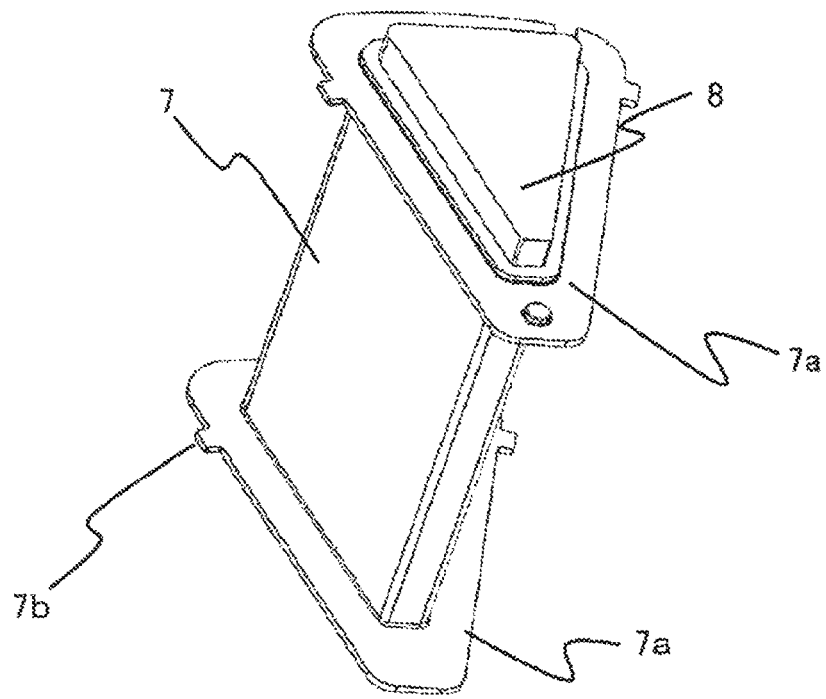
FIG. 3A is a perspective view illustrating a configuration of a core and a bobbin according to Embodiment 1.
Figure 3B:
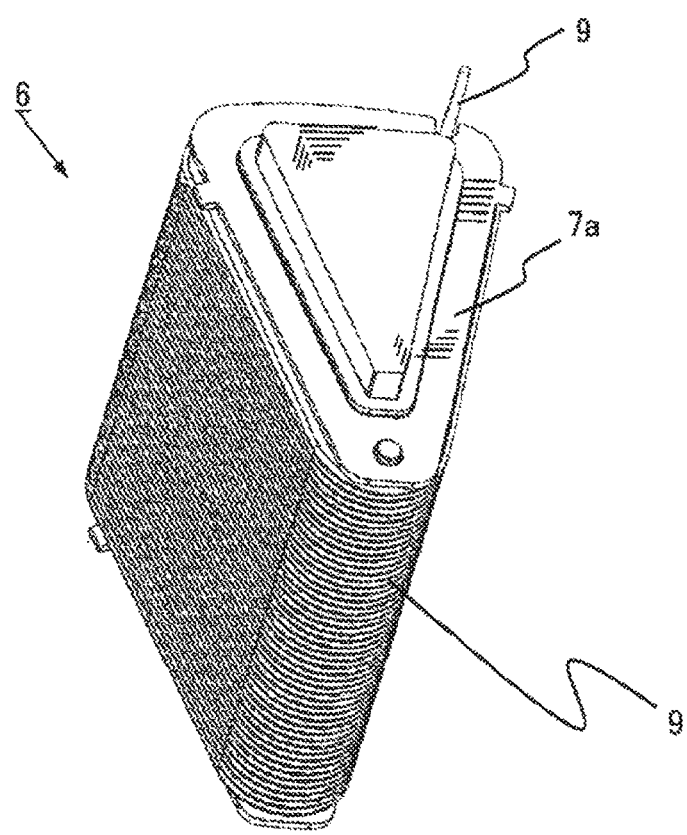
FIG. 3B is a perspective view illustrating a configuration of a core member around which further a coil has been wound.

FIGS. 3(a) and 3(b) illustrate a configuration of the stator core member 6. The stator core member 6 includes the core 8, the bobbin 7, and a coil 9. The core 8 is a laminated core formed by laminating (tape-shaped) foil strips of an amorphous metal made of a magnetic material while gradually changing the widths of the foil strips from the axis in the radial direction. The shape of the core 8 is a generally columnar shape having a generally trapezoidal shape in cross-section in the radial direction, and the core 8 has end surfaces in the rotary shaft direction as magnetic flux surfaces facing rotor surfaces. Note that the shape of the core 8 is not limited to this, and may be a generally frustum shape having a diameter changing in the rotary shaft direction, or may have any of various shapes such as a circle or an ellipse in cross-section in the radial direction. Moreover, the core 8 may be formed by laminating foil strips or thin steel plates in the rotation direction or may be molded with powders.

The bobbin 7 is made of an insulating material such as resin, and made of a tubular body having an inner peripheral shape that generally coincides with the outer peripheral shape of the core 8. The bobbin 7 made of a tubular body has, near the two end portions in the shaft direction, flange portions 7a which extend in the rotation direction and the radial direction by a predetermined width. When the core members 6 are arranged annularly at the time of resin molding, a protrusion 7b comes into contact with the protrusion 7 of the adjacent core member 6 in the rotation direction and/or the shaft direction, so that the core members 6 are positioned. In addition, the adjacent protrusions 7*b* come into contact with each other to ensure the flow passage of the molding resin with which to fill a void 10 between the coils of the adjacent core members 6. Note that other means for positioning the core members 6 at predetermined intervals may be employed without providing the protrusions 7*b*. The core member 6 is configured by inserting the core 8 into the bobbin 7, and winding the coil 9, which is made of aluminum, copper, or the like, between the two flanges 7*a* in the shaft direction.

Here, the number of layers of the coil 9 to be wound around the bobbin 7 is not necessarily the same between both flange portions 7*a*. This is required because a winding start coil terminal 9*s* and a winding end coil terminal 9*e* should be drawn out on the same side (the output-shaft side or the opposite-output-shaft side) in the shaft direction in the other core members 6. For example, it is possible to determine the size of the bobbin, and the diameter and the number of steps of the coil, in consideration of all of the length of the coil winding region of the bobbin 7, the wire diameter, the number of winding layers, and the number of turns of the coil 9, as well as the direction in which the winding start and winding end terminals are drawn out. It is however difficult to always make constant the diameter, the number of winding steps, and the like, of the coil from the aspects of outputs, costs associated with size variation in view of production, and a reduction in size of armatures.

Accordingly, the coil 9 is folded back on the way and wound back to make the winding end coil terminal 9*e* in the outermost layer coincide with the position of the wire drawing-out point, in order to prevent the wound coil 9 from reaching a planned amount to be wound on the way of the outermost layer and leaving a distance from the winding end coil terminal 9*e* to the wire drawing-out point.

Figure 4A:
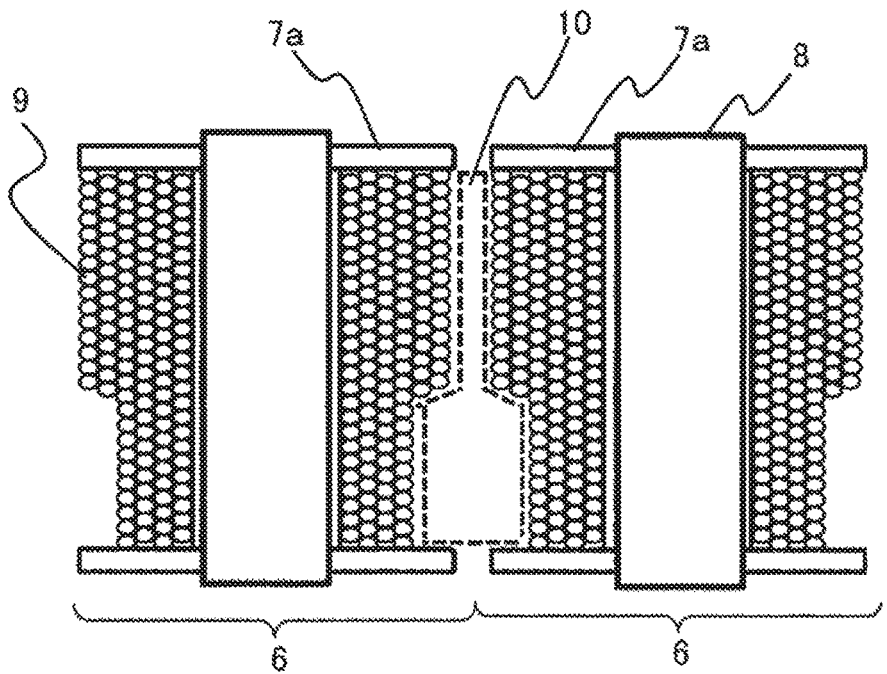
FIG. 4A is a cross-sectional view illustrating how core members according to Comparative Example are arranged adjacently.
Figure 4B:
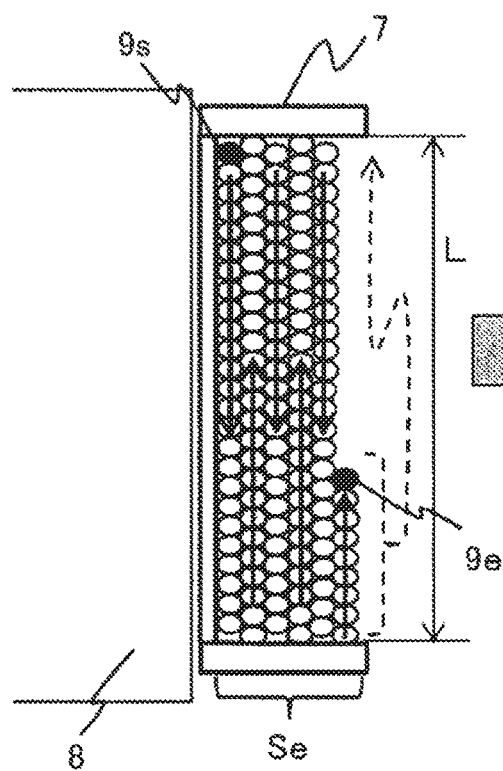
FIG. 4B is a schematic view illustrating an aligned winding of a coil according to Comparative Example.
Figure 4C:
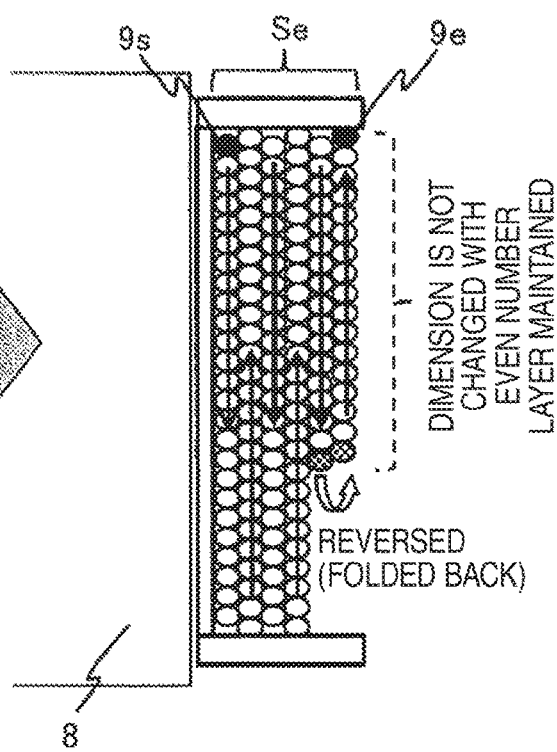
FIG. 4C is a schematic view illustrating how the coil is wound according to Embodiment 1.

FIG. 4(*a*) schematically illustrates a vertical cross-section of the core members 6 arranged annularly.

As illustrated in FIG. 4(*a*), the coil is wound, in two steps on the outer peripheral side, one-sidedly on the side of one of the flange portions 7*a*. FIG. 4(*b*) illustrates Comparative Example in which a coil is simply wound normally, which illustrates that there remains a distance between the flange portion 7*a* on the output-shaft side and the position at which the winding of the coil ends in the outermost turn in relation to the amount of the wound coil. Specifically, the coil starts being wound from the winding start coil terminal 9*s* at the flange portion 7*a* on the output-shaft side, and once the first step of the coil being wound reaches the flange portion 7*a* on the opposite-output-shaft side, the coil is again wound back to the flange portion 7*a* on the output-shaft side. This is repeated to the winding end coil terminal 9*e*. In this case, the coil terminal 9*e* is still on the way of the sixth layer when the planned amount of winding is reached, and does not reach the wire drawing-out point provided at the flange portion 7*a* on the output-shaft side.

On the other hand, in this embodiment, as illustrated in FIG. 4(*c*), the coil is folded back on the way of the fifth layer, and is wound such that the coil winding end terminal 9*e* comes to the flange portion 7*a* on the same side as the winding start coil terminal 9*s*. In other words, part of the fifth layer is wound as the sixth layer.

As a result, on the side where the number of layers is smaller, the void 10 with the adjacent coil 9 is larger, and on the opposite side, the void 10 is smaller. When the void 10 is filled with resin (mainly) in the rotary shaft direction (the vertical direction in the drawings) in the resin molding step, there is a possibility that the resin could not sufficiently reach the portion where the void 10 is small, so that problems remain in strength and insulation. In particular, the portion where the void 10 between the coils is small largely affects the insulation and the strength as compared with the portion where the void 10 is large, and it thus can be said that it is highly necessary to sufficiently fill such portion with resin.

Note that as the method of ensuring the flow passage of resin between the adjacent coils 9, this may be achieved by elongating the bobbin 7 in the shaft direction so as to reduce the number of winding steps, or by reducing the amount of the coil 9 to be wound; however, there still remain problems in ensuring a reduction in size (including the flatness) and of reduction in output.

In view of this, one of the characteristics of this embodiment is that core members having different numbers of winding steps of a coil on one side in the shaft direction and the other side in the shaft direction are arranged alternately such that a coil having a larger number of winding steps and a coil having a smaller number of winding steps face each other.

Figure 5:
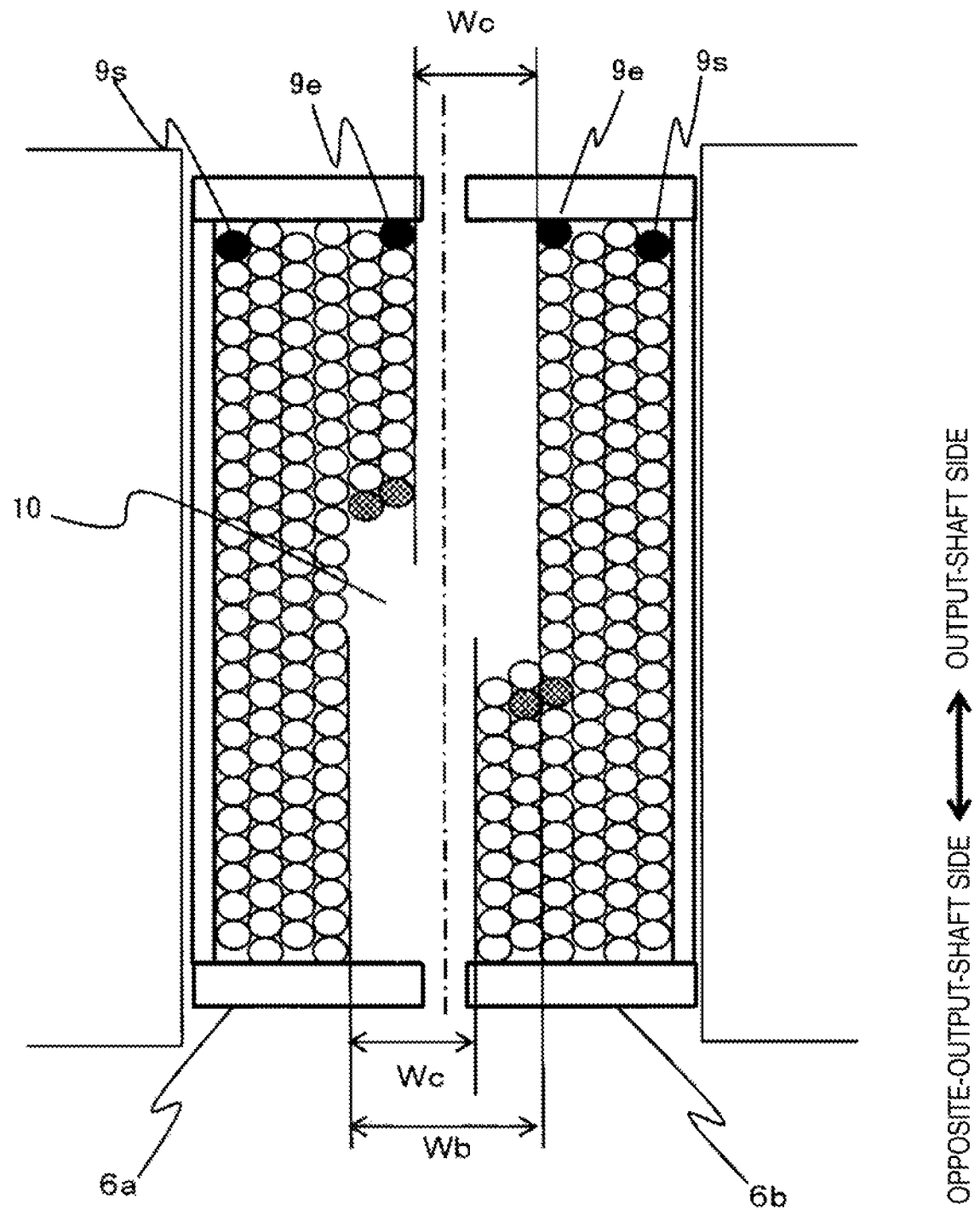
FIG. 5 is a cross-sectional view illustrating a relation between the respective coils of a first core member and a second core member according to Embodiment 1 which have been arranged adjacently.

FIG. 5 illustrates a partial vertical cross-sectional view of the adjacent core members 6 according to this embodiment. A first core member 6*a* has a larger number of winding layers of the coil 9 on the output-shaft side while a second core member 6*b* has a larger number of winding layers of the coil 9 on the opposite-output-shaft side. Arranging the adjacent core members such that the coil having a larger number of winding layers and the coil having a smaller number of winding layers face each other in this manner allows the width of the void 10 formed between the adjacent coils to be sufficiently and substantially uniformly ensured.

In addition, as is clear from the same figure, it is also one of the characteristics that the drawing-out directions of both of the winding start coil terminal 9*s* and the winding end coil terminal 9*e* are on the output-shaft side in both of the first core member 6*a* and the second core member 6*b*. For example, it is possible to ensure the void 10 having a sufficient and uniform width by reversing the direction of the first core member 6*a* in the shaft direction to cause a coil having a larger number of winding layers and a coil having a smaller number of winding layers to face each other. In this case, however, the drawing-out direction of the coil winding start terminal and the coil winding end terminal of one of the coils is also reversed (on the opposite-output-shaft side). If the drawing-out directions of the coils are the same, it is favorable in terms of the assemblability of the electric machine 1.

Figure 6A:
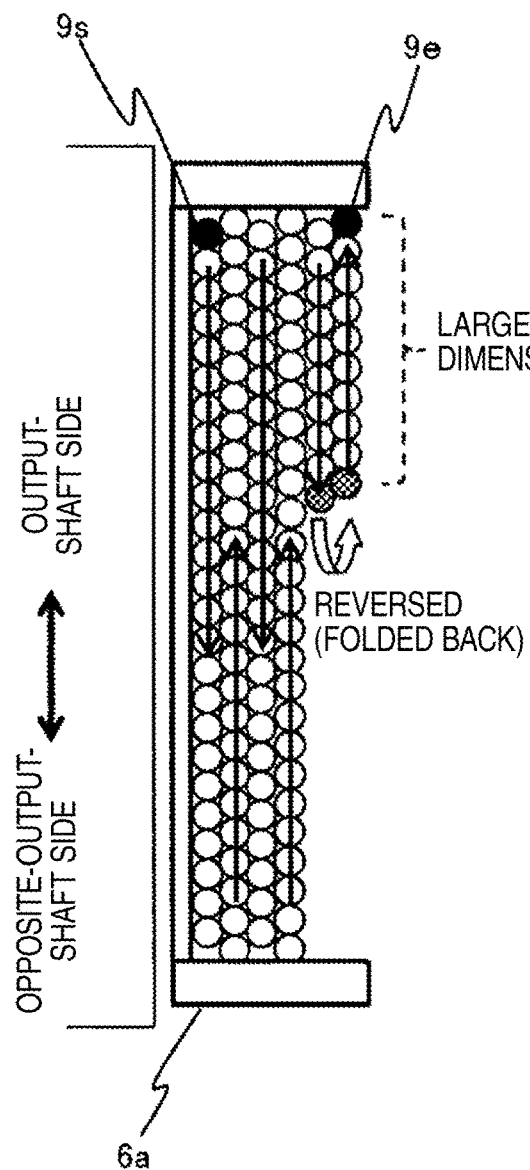
FIG. 6A is a schematic view describing a procedure of winding the coil around the first core member according to Embodiment 1.
Figure 6B:
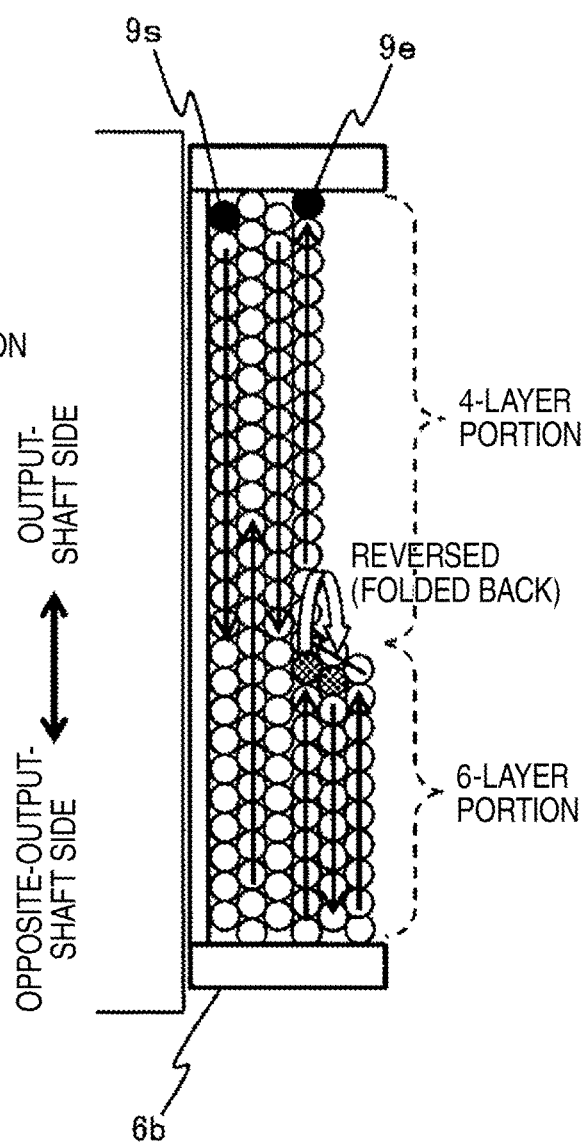
FIG. 6B is a schematic view describing a procedure of winding the coil around the second core member.

FIG. 6(*a*) illustrates a procedure of winding the coil around the first core member 6*a*. First, the coil starts being wound from the coil winding start terminal 9*s* near the base of the bobbin flange portion 7*a* on the output-shaft side. The coil is kept being wound while being folded back near the base of each flange portion 7*a* up to the fourth layer. The coil is then folded back on the way of the fifth layer, and is wound to the flange portion 7*a* on the output-shaft side where the wire drawing-out point is provided. In other words, the coil starts being folded back at an odd number layer (the fifth layer).

FIG. 6(*b*) illustrates a procedure of winding the coil around the second core member 6*a*. First, the coil starts being wound from the coil winding start terminal 9*s* near the base of the bobbin flange portion 7*a* on the output-shaft side, as in the case of the first core member 6*a*. Although the coil is wound similarly up to the third layer, in the case of the second core member 6*b*, the coil is folded back to the flange portion 7a on the opposite-output-shaft side on the way of the fourth layer, and thereafter is repeatedly wound while folded back up on the way up to the sixth layer. Thereafter, once the coil in the sixth layer is wound to near the coil wound in the fifth layer, the coil is then wound one turn as the fifth layer and then wound as the fourth layer continuously to the flange portion 7a on the output-shaft side. In other words, in the second core member 6b, the coil starts being folded back at an even number layer (the fourth layer). In this way, the wire drawing-out direction of the coil winding end terminal Se in the second core member 6b becomes also on the output-shaft side.

As described above, according to the core members 6 of Embodiment 1, the coil having a larger number of winding layers has a larger width in the rotation direction, and thus, the coil having a smaller number of winding layers has a smaller width in the rotation direction. Accordingly, the width of the void 10 between the adjacent coil members is ensured to be sufficient and substantially uniform, which increases the fluidity of resin, ensuring the filling.

In addition, according to the core members 6 of Embodiment 1, the drawing-out directions of the coil terminals 9s and 9e in the adjacent first core member 6a and second core member 6b are the same, which also improves the assemblability of the electric machine 1.

Embodiment 2

Next Embodiment 2 will be described. The core members 6 of Embodiment 1 have one characteristic in which the number of layers of the coil wound around the second core member 6b adjacent to the first core member 6a is the reverse of that of the first core member 6a. In other words, the first core member 6a and the second core member 6b have stepwise appearances having generally the same number of steps (two steps), which are symmetric about a point.

By contrast, in addition to the characteristic in which the numbers of winding layers of the coils in the shaft direction are different for the adjacent core members 6 like Embodiment 1, core members 6 of Embodiment 2 have one characteristic in which a first core member 6c is such that the coil is folded back on the way to the flange portion 7a and is then repeatedly wound normally staring from the folded-back coil portion, while a second core member 6d is such that the coil is folded back on the way between the flange portions 7a, and thereafter, is further folded back at a position closer to one of the flange portions 7a than the folded-back portion, and is then repeatedly wound normally. As a result, for example, the first core member has a stepwise appearance having generally two steps, while the second core member has a stepwise appearance having generally three steps, so that the adjacent core members have asymmetrical appearances.

Figure 7:
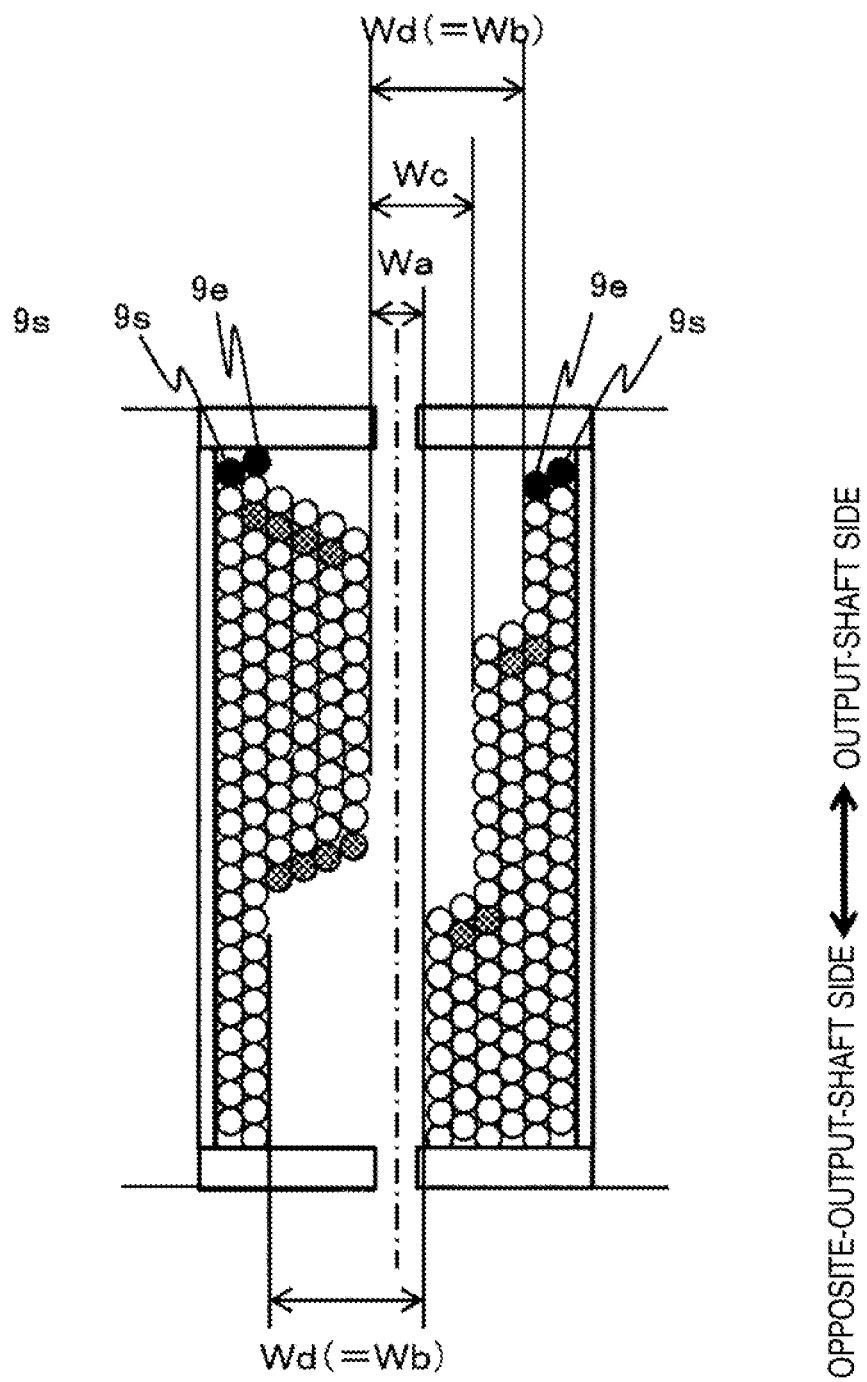
FIG. 7 is a cross-sectional view illustrating a configuration of coils of a first core member and a second core member according to Embodiment 2 which have been arranged adjacently.

FIG. 7 illustrates vertical cross-sectional shapes of the first core member 6c and the second core member 6d according to Embodiment 2. Note that Embodiment 2 also has the same diameter and the same number of turns of the coils to be wound as those of Embodiment 1, and the drawing-out direction of the coil 9 is also the same direction (the output-shaft side or the opposite-output-shaft side).

In this embodiment, a width Wc from the outer periphery of the coil of the outermost layer (the sixth layer) in the first core member 6c to an intermediate step (the fourth layer) in the second core member 6d is larger than a width Wa between the adjacent flange portions 7a. In other words, in the void 10, a portion where the width between the adjacent coils is smallest becomes wider than Wa at the main flow inlet of resin, sufficiently ensuring the flow inlet passage of resin.

Figure 8:
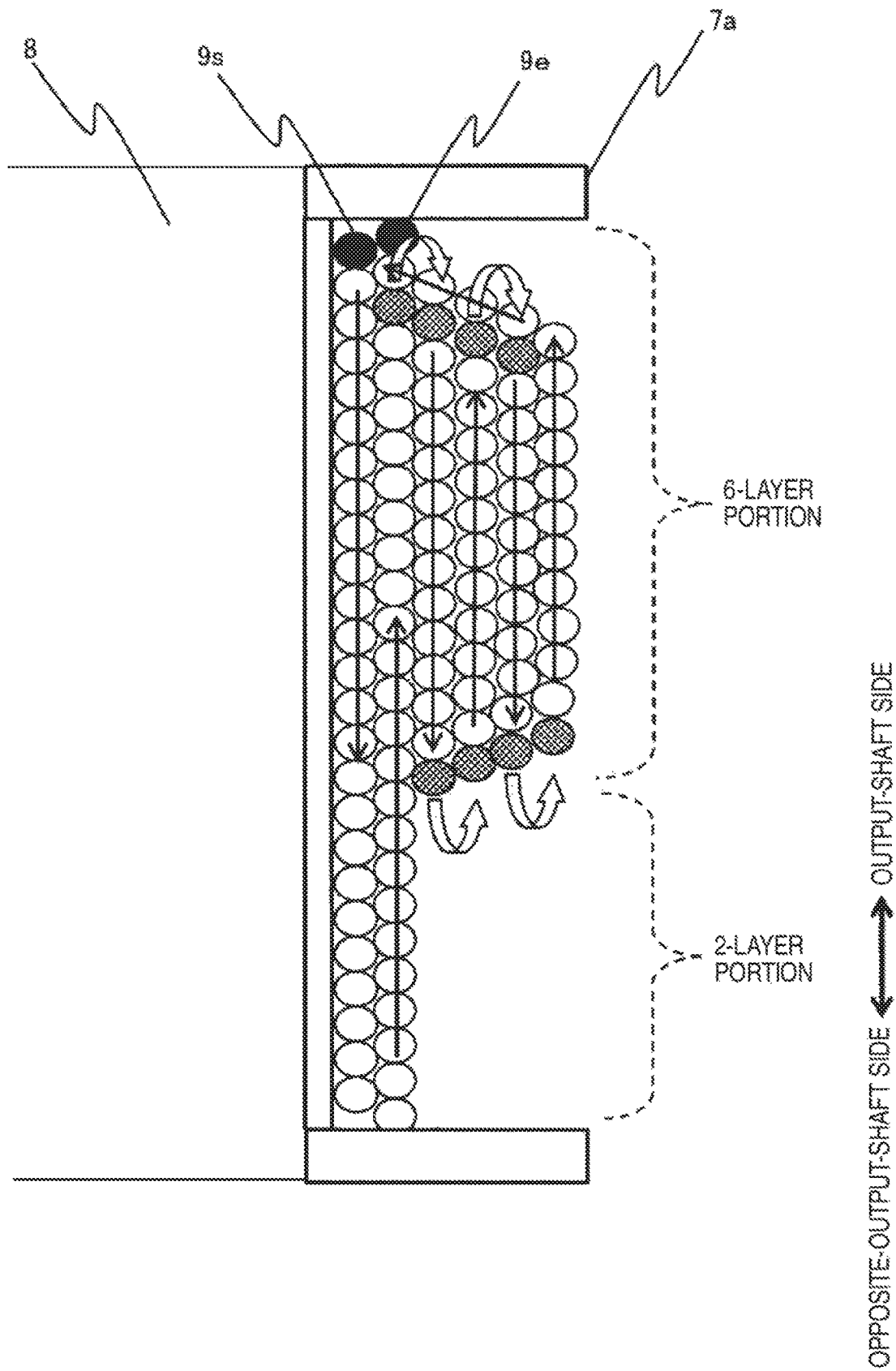
FIG. 8 is a schematic view describing a procedure of winding the coil around the first core member according to Embodiment 2.
Figure 9:
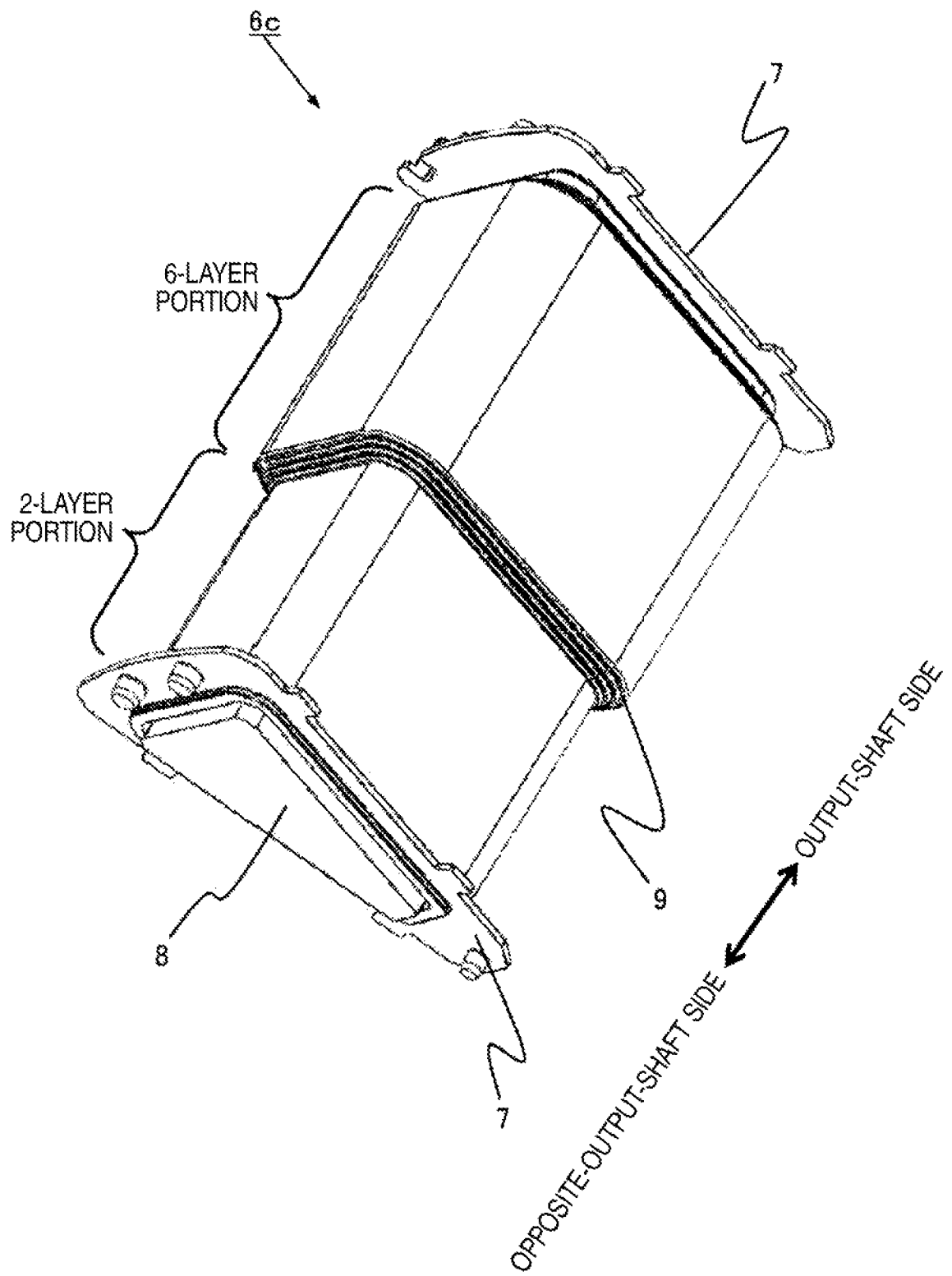
FIG. 9 is a schematic view illustrating an appearance of the first core member according to Embodiment 2.

FIG. 8 illustrates a procedure of winding the coil around the first core member 6c. In the first core member 6c, the coil starts being wound frond a coil winding start terminal 9s near the flange portion 7a on the output-shaft side to form the first layer, and is then folded back near the flange portion 7a at the end portion on the opposite-output side and is wound normally to form the second layer. Thereafter, the coil is folded back on the way of the third layer, and is then repeatedly wound normally up to the sixth layer based on the folded-back coil in the third layer. From the end of the sixth layer, the coil is wound sequentially in the fifth to second layers on the output-shaft side, and then the winding end terminal of the coil is drawn out. FIG. 9 illustrates a perspective view of an appearance of the first core member 6c. The appearance is of a generally two-step configuration including a six-layer portion and a two-layer portion.

In addition, once the coil in the second layer is wound to the flange portion 7a on the output-shaft side (to between the winding start coil terminal 9s and the second turn of the first layer), the coil in the third layer is then wound between the second turn and the third turn of the coil in the second layer, counted from the flange portion 7a on the output-shaft side. In the following layers as well, the coil is wound at a position closer to the opposite-output-shaft side by one turn from the flange portion 7a on the output-shaft side every time the wire is folded back.

This allows the flange portion 7a not to be pressed in the shaft direction by the winding of the coil, thus prevents the flange portion 7a from being deflected in the shaft direction or being broken. In addition, since the wire drawing-out point at which the winding end coil terminal 9e is drawn out is formed near the core 8 on the flange portion 7a, it is possible to guide the winding end coil terminal to a position where the load of coil tension is relatively less likely to be applied to the led-out wire and the wire drawing-out point.

Figure 10:
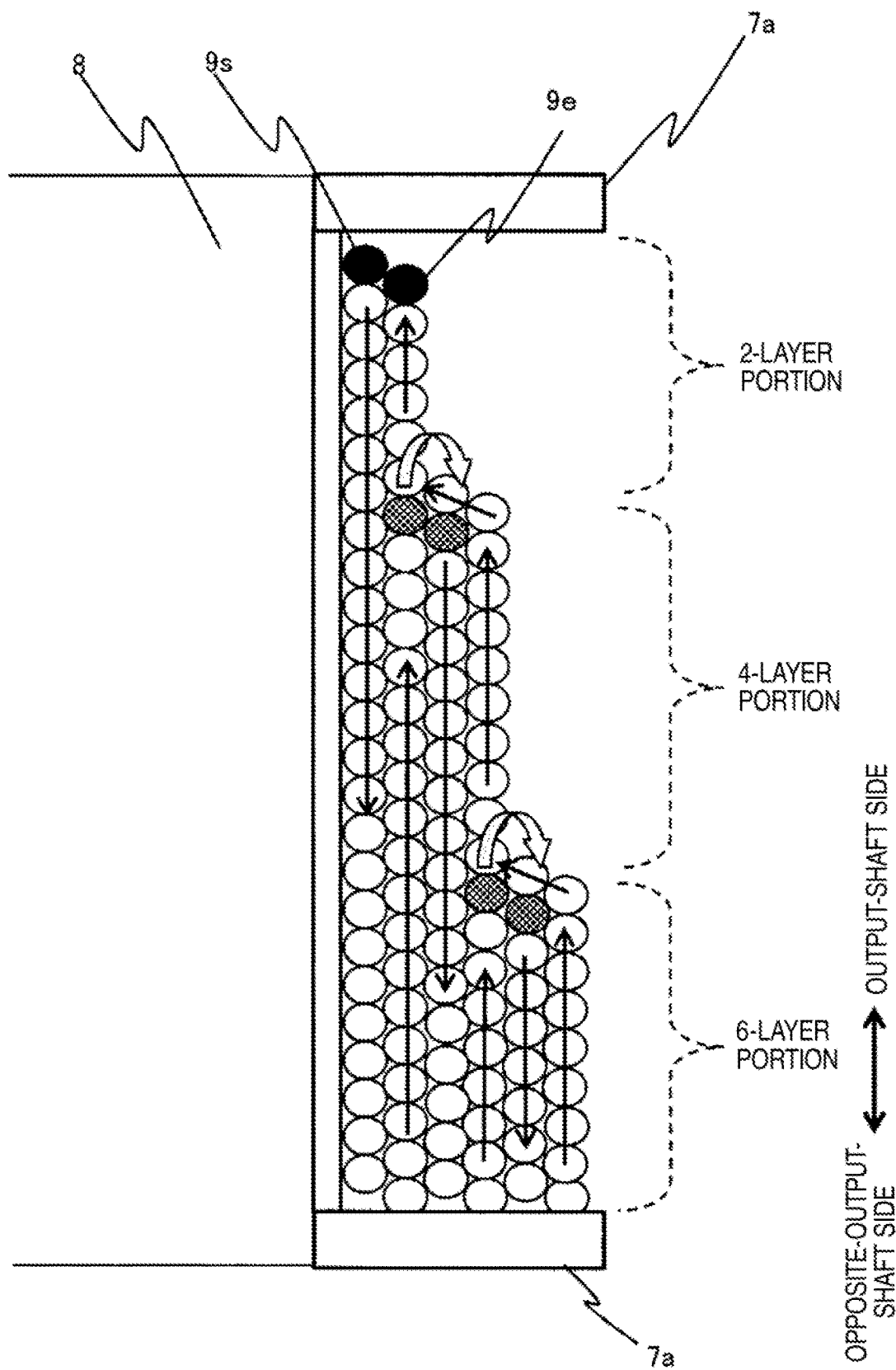
FIG. 10 is a schematic view describing a procedure of winding the coil around the second core member according to Embodiment 2.
Figure 11:
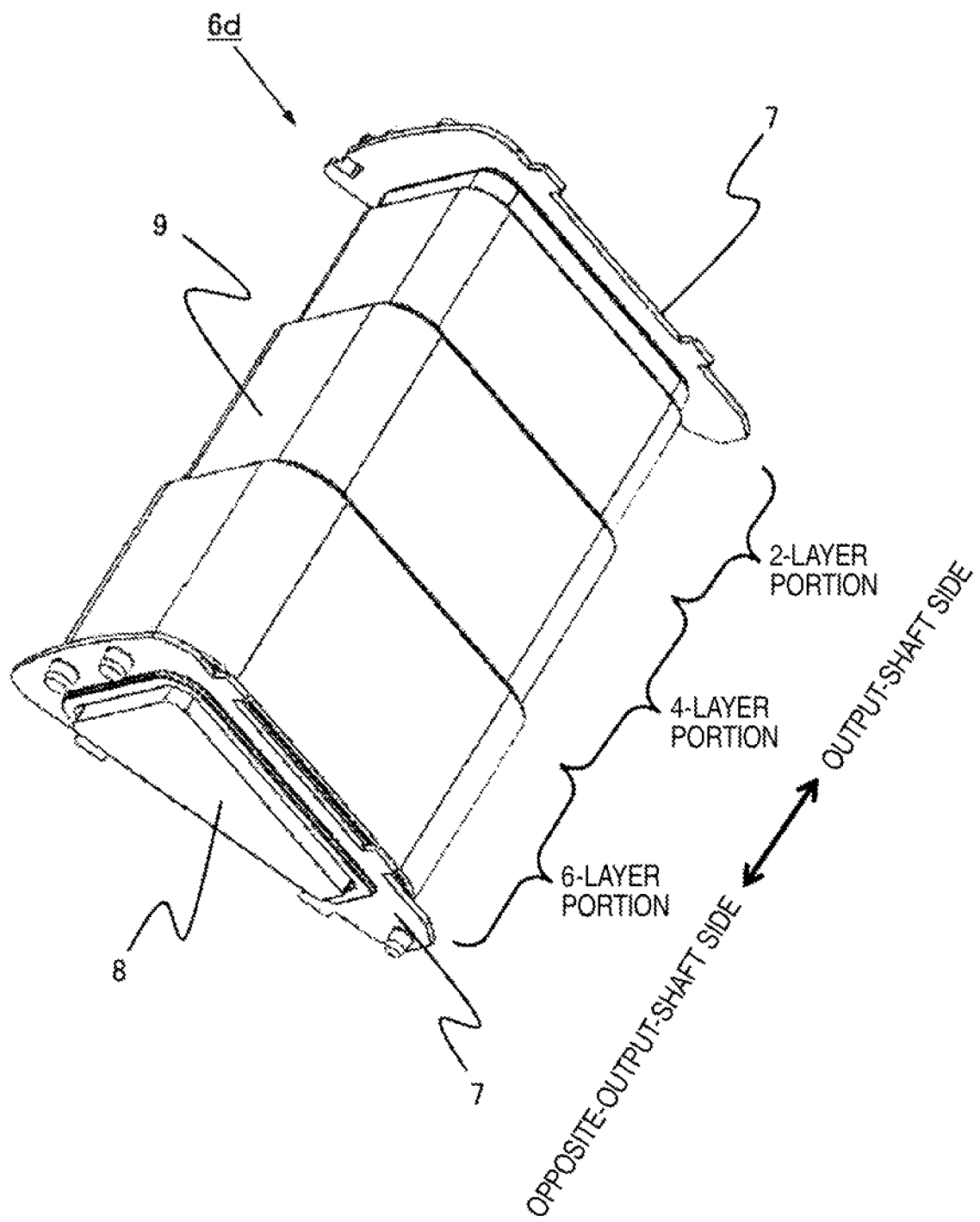
FIG. 11 is a schematic view illustrating an appearance of the second core member according to Embodiment 2.

FIG. 10 illustrates a procedure of winding the coil around the second core member 6d. In the second core member 6d, the coil starts being wound from a coil winding start terminal at the flange portion 7a on the output-shaft side to form the first layer. The coil is folded back on the way of the second layer and is then wound normally to form the third layer. The coil is folded back in the fourth layer at a position further closer to the flange portion 7a on the opposite-output-shaft side than the folding back point in the second layer and is then wound normally to form the fifth layer. Thereafter, from the end of the sixth layer, the coil is wound in such a manner as to form the outermost periphery of each layer, and the winding end coil terminal is drawn out from the flange portion 7a on the output-shaft side in the second layer. FIG. 11 illustrates a perspective view of an appearance of the second core member 6d. The appearance is of a generally three-step configuration including a six-layer portion, a four-layer portion, and a two-layer portion.

Figure 12:
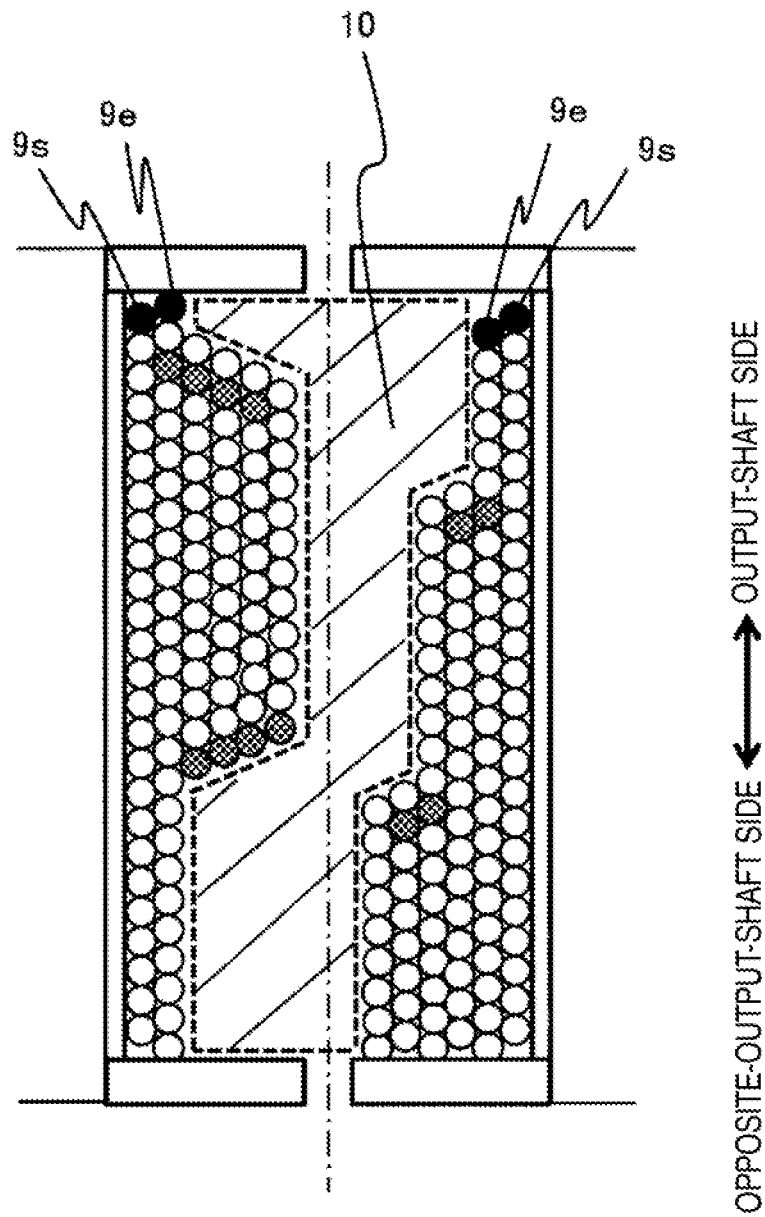
FIG. 12 is a cross-sectional view illustrating a relation of a void between the first and second core members according to Embodiment 2.
Figure 13:
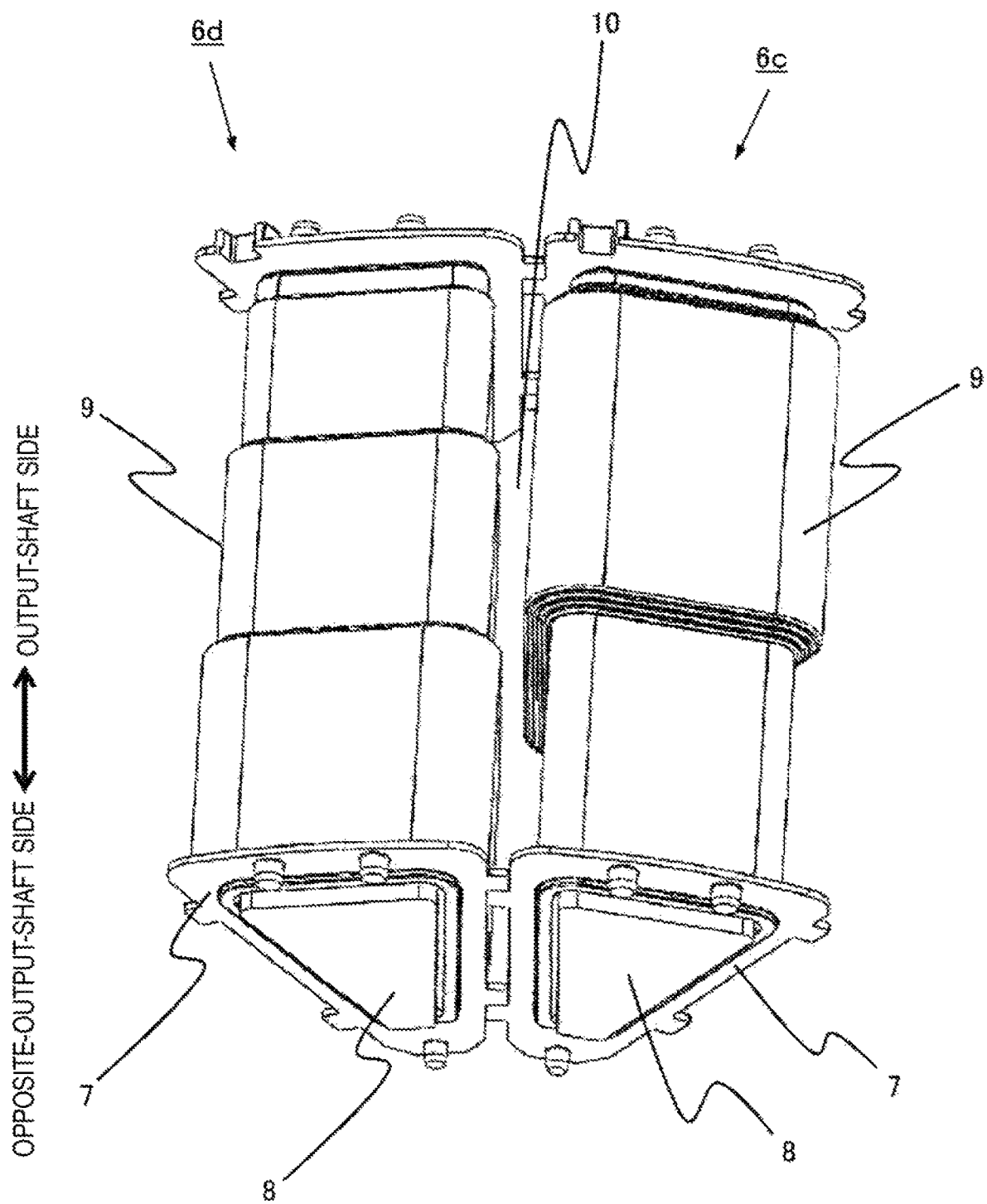
FIG. 13 is a schematic view illustrating an appearance of the first and second core members according to Embodiment 2 which have been arranged adjacently.

FIG. 12 schematically illustrates a cross section of a void 10 between the adjacent first and second core members. Since the coil portion in the second core member 6d is gradually widened in the form of three steps, it can be expected to more smoothly guide the flow of resin flowing in the shaft direction and to further promote the filling of the void 10 with the resin without any spaces left. FIG. 13 schematically illustrates a mode of arrangement where the first core member 6c and the second core member 6d are arranged adjacently.

In addition, Embodiment 2 can be said to be an effective configuration also in a case where when coils of adjacent core members are made symmetric about a point like Embodiment 1, the amount of winding is such that the cores partially come into contact with each other, or that the void 10 becomes significantly narrow, near a center of the void 10 in the shaft direction. On the other hand, Embodiment 2 makes it possible to reduce the coil winding width near the center of the coil member in the shaft direction, and to ensure the flow passage of resin with a sufficient width without contacting of the coils with each other.

Although the embodiments for carrying out the present invention have been described so far, the present invention is not limited to the above-described configurations, and may be modified in design in various manners without departing from the spirit of the present invention. For example, although the bobbin 7 is provided with the flange portions 7a for positioning the core member, and the like, this is not an essential configuration if it is possible to employ another means that is capable of holding the core members against the filling pressure of the resin molding.

In addition, although the above-described embodiments have been described with the coils being drawn out on the output-shaft side, the coil may be drawn out on the opposite-output-shaft side.

REFERENCE SIGNS LIST

1 . . . axial gap type electric machine, 2 . . . stator, 3 . . . rotor, 4 shaft, 5 . . . housing, 6 . . . core member, 6a and 6c . . . first core member, . . . 6b and 6d . . . second core member, 7 . . . bobbin, 7a . . . flange portion, 7b . . . protrusion, 8 . . . core, 9 . . . coil, 9s . . . winding star coil terminal, 9e . . . winding end coil terminal, 10 . . . void, 20 . . . molding resin

The invention claimed is:

1. An axial gap type rotating electric machine comprising:
a stator formed by arranging core members annularly around a rotary shaft with a predetermined void between each adjacent ones of the core members, and molding the core members with a molding material, the core members each having a core around which a coil is wound such that a number of turns of the coil is smaller on an outer peripheral side than on an inner peripheral side; and
a rotor facing an end surface of the core in a shaft direction with the predetermined void therebetween, wherein
the core members comprise:
   a first core member in which a first number of winding layers of the coil on one side in the shaft direction is larger than a second number of winding layers on another side opposite from the one side; and
   a second core member in which a third number of winding layers of the coil on the one side in the shaft direction is smaller than a fourth number of winding layers on the another side; and
in the stator, the first and second core members are arranged alternately such that the coil on the one side of the first core member faces the coil on the one side of the second core member; and
the predetermined void is present between the coil of the first core member and the coil of the second core member;
the second and third number of winding layers remains unchanged over a majority of a length of the first and second core members between the one side and the another side; and
in a radial direction of the stator, a central portion of the predetermined void between an inner periphery of the stator and an outer periphery of the stator is wider than a remainder of the predetermined void between the first and second core members.

2. The axial gap type rotating electric machine according to claim 1, wherein
in the second core member, the third and fourth number of winding layers of the coil gradually increases in the shaft direction.

3. The axial gap type rotating electric machine according to claim 2, wherein
numbers of winding layers of the coil increase by at least two or more successive layers.

4. The axial gap type rotating electric machine according to claim 1, wherein
a winding start terminal and a winding end terminal of the coil wound around each core member are drawn out on an output side or an opposite-output side of the rotary shaft.

5. The axial gap type rotating electric machine according to claim 4, wherein
in the second core member, coils wound in an outermost layer and an even layer are wound in outermost peripheries of all layers.

6. The axial gap type rotating electric machine according to claim 1, wherein
the molding material is resin.

7. The stator according to claim 1, wherein the predetermined void is filled with the molding material.

8. A stator formed by arranging a plurality of core members annularly around a rotary shaft, each of the plurality of core members having a core which has a magnetic flux surface in a direction of the rotary shaft and a coil wound around the core such that a number of turns of the coil is smaller on an outer peripheral side than on an inner peripheral side, wherein
the plurality of core members includes:
   a first core member in which a first number of winding layers of the coil on one side in the shaft direction is larger than a second number of winding layers on another side; and
   a second core member in which a third number of winding layers of the coil on the one side in the shaft direction is smaller than a fourth number of winding layers on the another side,
the first and second core members are arranged alternately such that the coil on the one side of the first core member faces the coil on the one side of the second core member with a predetermined void therebetween, and
the plurality of core members are integrally molded together with a molding material; and
the predetermined void is present between the coil of the first core member and the coil of the second core member; and
the second and third number of winding layers remains unchanged over a majority of a length of the first and second core members between the one side and the another side.

9. The stator according to claim 8, wherein the molding material is resin.

10. The stator according to claim 8, wherein the predetermined void is filled with the molding material.

* * * * *